United States Patent [19]

Tokushige et al.

[11] 3,899,575

[45] Aug. 12, 1975

[54] PROCESS OF BAKING OR GRAPHITIZING CARBON MOLDINGS

[75] Inventors: Toshio Tokushige; Motokiyo Nagayasu, both of Ehime, Japan

[73] Assignee: Sumitomo Chemical Company Limited, Osaka, Japan

[22] Filed: Mar. 21, 1973

[21] Appl. No.: 344,022

[30] Foreign Application Priority Data

Mar. 23, 1972  Japan................................ 47-29550
Jan. 22, 1973  Japan................................. 48-9733

[52] U.S. Cl.................................. 423/448; 423/449
[51] Int. Cl....................... C01b 31/02; C01b 31/04
[58] Field of Search ............... 423/448, 449; 264/29

[56] References Cited
UNITED STATES PATENTS 702,758   6/1902   Acheson............................ 423/448
1,357,290  11/1920  Kemmer............................ 423/448

OTHER PUBLICATIONS

Handbook of Chemistry and Physics, 43rd Edition, 1961, pp. 1852, 1853, & 1856–1859.

*Primary Examiner*—Edward J. Meros
*Attorney, Agent, or Firm*—Sughrue, Rothwell, Mion, Zinn & Macpeak

[57] ABSTRACT

In case of baking or graphitizing carbon moldings covered by packing granular cokes, the oxidation of the packing cokes can be effectively prevented by covering further the surface of the packing cokes placed around the carbon moldings with refractory balls having diameters larger than the sizes of the packing cokes but smaller than about 50 mm.

9 Claims, No Drawings

PROCESS OF BAKING OR GRAPHITIZING CARBON MOLDINGS

BACKGROUND OF THE INVENTION

1. Field of the Invention

The present invention relates to a process of baking or graphitizing carbon moldings. More particularly, the invention relates to a process of baking or graphitizing carbon moldings which can be practiced with less oxidation loss of packing cokes placed around the carbon moldings in a baking furnace or graphitizing furnace and with improved working performance.

2. Description of the Prior Art

Carbonaceous electrodes such as carbon electrodes and graphite electrodes and also various carbonaceous products to be used as structural materials such as carbon bricks, lining refractories for furnaces, porous carbon articles and graphite, etc., have, at present, been produced by grinding and pulverizing into proper sizes a raw carbonaceous material such as petroleum coke, pitch coke, metallurgical coke, etc., kneading thus pulverized carbonaceous material with an organic binder such as pitch and tar, forming the kneaded mixture into the desired green carbon moldings, placing the green carbon moldings in a a baking furnace, packing petroleum cokes, metallurgical cokes, etc., having adjusted granular sizes of, in general, 1–20 mm. (hereinafter, those cokes are called "packing cokes" in this specification and claims) in spaces surrounding the carbon moldings in the furnace for preventing the carbon moldings from being deformed and oxidized during baking operation, baking the carbon moldings by heat treatment to temperatures in the range of about 700° to about 1,400°C, taking off, upon completion of the baking operation, the packing cokes by means of suction device, and then removing the baked carbon molding from the baking furnace.

Furthermore, graphitized carbon products such as artificial graphite electrodes, graphite plates or rods for using as electrode in electrolysis, impervious carbon graphite articles, welding rods, refratory bricks, etc., have been produced by loading the carbon moldings baking by the aforesaid manner in situ or after partially molding and fabricating them in a graphitizing furnace, packing in spaces surrounding the baked carbon moldings with petroleum cokes, coal cokes, pitch cokes, etc., having adjusted granular sizes of, in general, 0.5–10 mm. (hereinafter, they are also called "packing cokes") as electric resistor in initial heat treating stage, graphitizing the carbon moldings by heating electrically them to temperatures above about 1,600°C., particularly of 1,900° to 3,300°C., taking off the packing cokes after graphitization operation by means of a suction device, and then removing the graphitized carbon moldings from the graphitizing furnace.

At baking or graphitizing carbon moldings as described above, it has been practiced for preventing the packing cokes from being oxidized during baking or graphitizing to cover the upper surface of the packing cokes packed around the carbon moldings with silica sand, a mixture of coke and silica sand, refractory bricks, etc. However, in case of covering the packing cokes with silica sand, it is difficult to separate the silica sand from the packing cokes owing to the small sizes of the granules of silica sand, which results in the partial mixing of silica sand in the packing cokes and making it difficult to reuse them. Also, in case of covering the packing cokes with carbon bricks, it is necessary, as stated above, to remove with manual labor the bricks placed over the packing cokes after the baking or graphitizing is over, which results in causing such troubles that the workability for placing or removing the bricks and further the heat of bricks after baking or graphitizing worsens the working condition in case of removing the brick from the furnace.

Still further, in case of using silica sand, the silica sand is formed a crust at baking or graphitizing owing to the low refractoriness and in case of using refractory brick, they do not closely fit in the deformation of the packing cokes caused by the expansion or shrinkage of the volume of the carbon moldings during baking or graphitizing. Consequently, in such cases, hollow spaces are formed between the upper surface of the packing coke layer and the refractory brick or the crust of the silica sand by the rising or sinking of the upper surface of the packing cokes and thus the packing cokes are readily to be brought into contact with oxidizing gases, which results in increasing the oxidation of the packing cokes.

SUMMARY OF THE INVENTION

Under such circumstances the inventors have investigated for establishing a baking or graphitizing process of carbon moldings capable of preventing effectively the oxidation of the packing cokes and greatly improving the working performance for baking or graphitizing and as the results thereof the process of this invention which can overcome the aforesaid difficulties in conventional techniques has been established.

That is, according to the present invention, there is provided a process of baking or graphitizing carbon moldings which comprises covering, at baking or graphitizing carbon moldings covered by packing cokes, the upper surface of the packing cokes with refractories having sizes larger than the sizes of the packing cokes but smaller than about 50 mm.

DETAILED DESCRIPTION OF THE INVENTION

The process of this invention will, then, explained below in detail.

The refractories to be used for covering the upper surface of the packing cokes covering the carbon moldings in the present invention are ones having the sizes larger than the sizes of the packing cokes but smaller than about 50 mm., preferably, having the sizes of 5–30 mm. if the sizes of the refractories are smaller than or same as those of the packing cokes, the separation of the refractories from the packing cokes becomes difficult. On the other hand, if the sizes of the refractories are over 50 mm., the refractories placed over the packing cokes do not closely fit in the rising or sinking of the upper surface of the packing cokes caused by the expansion or shrinkage of the volume of the carbon moldings during baking or graphitizing, which results in forming hollow spaces between the upper surface of the packing cokes and the refractories and increasing the oxidation of the packing cokes as well as making it difficult to practice economically the removal of the refractories by suction.

There are no particular limitations or restrictions about the forms of the refractories to be used for covering the packing cokes in the process of this invention and they may be used in the forms of balls or granules, tablets, cubes, etc., each having the sizes larger than those of the packing cokes but smaller than about 50 mm., preferably the sizes of 5–30 mm., but the use of the refractories in the form of balls or granules is particularly desirable.

The refractories to be used at baking operation according to the present invention have the refractoriness of higher than 900°C., preferably higher than 1,000°C., that is, any refractories durable to the temperature of the baking operation. There are also no particular limitations about the kinds of the refractories but in general alumina, clays, silica, magnesia, zirconia, and zircon are used and in particular, sintered high quality alumina balls, sintered chamotte balls, and sintered zirconia balls are preferably used.

Also, the refractories to be used at graphitizing according to the present invention have the refractoriness of higher than about 1,600°C., preferably higher than 1,800°C., that is, any refractories durable to the temperature of the surface of the packing cokes covering the carbon moldings at graphitizing can be used without limitation about the kinds of them. However, usually sintered high quality alumina, sintered silicon carbide, sintered zirconia, sintered zircon, etc., are used but in particular, high quality alumina balls, silicon carbide balls, and zirconia balls are preferably used.

Also, there are no particular limitations about the compressive strength of the refractories to be used in the present invention. That is, the compressive strength of them may be one causing no collapse of them in case of taking off the refractories by suction but in general the refractories having compressive strength of higher than 100 Kg/cm$^2$, in particular higher than 500 Kg/cm$^2$ are used.

In the practice of the process of this invention, the refractories as described above are superposed on the upper surface of the packing coke layer in generally more than two layers, preferably in 3–10 layers.

At baking the green carbon moldings, packing cokes having sizes smaller than 20 mm. are usually used. The packing cokes may be properly selected by the sizes, kinds, etc., of the carbon moldings to be baked.

As the baking furnace may be used a muffle-type kiln, a box-type kiln, a ring kiln-type furnace, a tunnel furnace, etc., using as the heat source a liquid fuel such as heavy oil, tar oil, etc.; a solid fuel such as coal; or a gaseous fuel such as coal gas, producer gas, natural gas, liquid petroleum gas, petroleum gas, etc.

The baking is generally conducted at temperatures of 700°–1,400°C.

After baking, the packing cokes and the refractories are removed from the furnace by, in general, suction and then the packing cokes are separated from the refractories by means of a proper sieve.

As the graphitizing furnace may be used an Acheson furnace, an improved Acheson furnace, or Criptol furnace.

In case of graphitizing the carbon moldings, packing cokes are in general, laid on the bottom of the graphitizing furnace, the carbon moldings to be graphitized are placed on the packing cokes laid on the bottom, and then packing cokes are placed in spaces between the walls of the furnace and the carbon moldings and also in spaces between carbon moldings each other as well as placed over the carbon moldings. In the graphitizing packing cokes having sizes smaller than 10 mm. are ordinary used but they may be properly selected according to the sizes and types of the carbon molding to be graphitized.

Then the surface of the packing cokes is, covered by the refractories having the sizes of larger than the sizes of the packing cokes but smaller than about 50 mm. occur. Still bricks The graphitizing furnace thus set is heated to temperatures of higher than 1,600°C., preferably to temperatures of 1,900°–3,300°C. by electric heating to graphitize the carbon moldings to a desired graphitization degree.

After the graphitization, the packing cokes and the refractories are removed from the graphitizing furnace by suction, a mechanical means, or hands and then the packing cokes are separated from the refractories by means of a proper sieve. Thus separated packing cokes and refractories may be reused.

According to the process of this invention, as described above, the refractories covering the packing cokes can fit in the rising or sinking of the surface of the packing coke layer caused by the expansion or shrinkage of the carbon moldings and thus the oxidation of the packing cokes can be greatly reduced in the same height or width of the cover layer for the packing cokes as compared with the case of conventional silica sand or refractory bricks which do not fit in the rising or sinking of the packing coke layer. Furthermore, in case of using silica sand for covering the packing cokes as in conventional manner, mixing of the silica sand into the packing cokes occurs to packing the loss of the useful packing cokes, while the case of applying the process of this invention, such a loss of filler cokes caused by the aforesaid reason does not occur. Still further, in case of using conventional refractory bricks or silica sand, the refractory bricks or the crust of silica sand must be removed from the furnace by hands or manually before removing the packing cokes after the baking or graphitizing of the carbon moldings is over, while in the process of this invention the refractories and the packing cokes can be removed at the same time by means of a suction device for separation each other and thus the workability is quite high in this invention. Furthermore, in the process of this invention the refractories and the packing cokes can be removed automatically by using a suction device, which improve remarkably the workability.

Moreover, in case of using cokes for covering the filler cokes, the cover layer or cokes having too higher length is required and thus the dimensions of the carbon moldings to be baked or graphitized must become smaller, while in the process of this invention, the height of the cover layer is not so high, the larger carbon moldings can be baked or graphitized in the same furnace.

As described above, the process of this invention can provide very large industrial advantages.

The following examples are intended to illustrate the present invention but not to limit in any way.

EXAMPLE 1 (BAKING OF GREEN CARBON MOLDINGS)

Prefabricated green carbon electrodes were loaded in a petroleum gas-fired furnace of using petroleum gas as the heat source (said furnace having four chambers each having a width of 550 mm., length of 1150 mm., and height of 3000 mm. and said four chambers being designated as A,B,C and D from the right side of the furnace) and then packing cokes having sizes of 3–15 mm. were placed in spaces around the green carbon electrodes to be baked.

On the surface of the packing cokes in the chamber A were laid in three layers of about 60 mm. in thickness alumina balls having a diameter of 19 mm., said alumina ball containing 90 percent by weight $Al_2O_3$ and 10 percent by weight $SiO_2$, having a refractoriness of 1900°C., and having compressive strength of 1500 Kg/cm².

On the surface of the packing cokes in the chamber B were laid in six layers of about 120 mm. in thickness the alumina balls same as laid in the chamber A.

For the sake of comparison, on the surface of the packing cokes in the chamber C were laid fully in a thickness of 65 mm. chamotto refractory bricks having a refractoriness of 1750°C. and the dimensions of 215 mm. × 105 mm. × 65 mm.

On the other hand, no cover was formed on the surface of the packing cokes in the chamber D.

Under the aforesaid conditions, the green carbon electrodes were baked for 10 hours at a baking temperature of about 1300°C. The oxidation loss of the packing cokes in each chamber is shown in Table 1.

Table 1

| No. | Process | Oxidation loss (g/cm²) |
|---|---|---|
| 1 | Invention process (Chamber A) | 4.2 |
| 2 | Invention process (Chamber B) | 1.9 |
| 3 | Comparison example (Chamber C) | 7.3 |
| 4 | Comparison example (Chamber D) | 16.0 |

As clear from Table 1. it will be understood that in the cases of applying the process of this invention (No. 1 and No. 2), the oxidation loss of the packing cokes were markedly less than those in the cases of applying conventional techniques (No. 3 and No. 4).

EXAMPLE 2 (BAKING OF GREEN CARBON MOLDINGS)

Green carbon articles were placed in a small electric furnace of using electric power as the heat source, said furnace having five chambers each having width of 500 mm., length of 500 mm., and height of 700 mm. and said five chambers being designated as A,B,C,D and E and then the packing cokes having sizes of 1–5 mm. were placed around the green articles.

On the surface of the packing cokes in the chamber A were laid in two layers of about 13 mm. in thickness mullite balls having a diameter of 6.4 mm., said balls containing 31.8 percent $Al_2O_3$ and 68.2 percent by weight $SiO_2$, having a refractoriness of 1000°C., and having compressive strength of 1000 Kg/cm².

On the surface of the packing cokes in the chamber B were laid in three layers of about 20 mm. in thickness the mullite balls same as laid in the chamber A.

On the surface of the packing cokes in the chamber C were further laid in six layers of 40 mm. in thickness the mullite balls same as laid in the chamber A.

For the sake of comparison, on the surface of the packing cokes in the chamber D were laid in a thickness of 20 mm. river sands having sizes of 0.2–2 mm.

On the other hand, no cover was formed on the surface of the packing cokes in the chamber E for testing control example.

Under above conditions, the green carbon articles placed in each chamber were baked for 5 hours at a baking temperature of about 1050°C. The oxidation loss of the packing cokes in each chamber after baking is shown in Table 2.

Table 2

| No. | Process | Oxidation loss (g/cm²) |
|---|---|---|
| 1 | Invention process (Chamber A) | 0.20 |
| 2 | Invention process (Chamber B) | 0.11 |
| 3 | Invention process (Chamber C) | 0 |
| 4 | Comparison example (Chamber D) | 0.30 |
| 5 | Comparison example (Chamber E) | 1.74 |

From the results shown in Table 2 it will be understood that the oxidation loss in the process of this invention (No. 1, No. 2 and No. 3) was greatly less than that in the conventional process.

In addition, in case of using river sands (No. 4), the river sands were formed a hard crust thereof and spaces were formed between the upper surface of the packing cokes and the crust of the river sands.

EXAMPLE 3 (GRAPHITIZATION OF CARBON MOLDINGS)

Baked carbon articles for producing artificial graphite electrodes were placed in a graphitizing furnace of a direct resistance type of using electric power as the heat source, said furnace having two chambers each having width of 2100 mm., length of 13000 mm., and height of 2200 mm. and the two chambers being designated as A and B from the right side of the furnace and then packing cokes having sizes of 0.83–4.7 mm. were placed in the furnace.

That is, on the surface of the packing cokes in the chamber A were laid in three layers of about 60 mm. in thickness alumina balls having a diameter of 19 mm., said balls containing 99 percent by weight $Al_2O_3$ and 1 percent by weight $SiO_2$, having a refractoriness of 2000°C., and having compressive strength of 1200 Kg/cm².

Also, for the sake of comparison, on the surface of the packing cokes in the chamber B were laid in a thickness of about 100 mm. a mixture of cokes having sizes of 1.7–4.7 mm. and silica sands having sizes of 0.2–2 mm. in a coke/silica sand mixing ratio of 70/30.

Under the above conditions, the electric furnace was heated for about 50 hours by supplying electric power, whereby the temperature at the center of the furnace reached about 3000°C. Then, the supply of the electric power was stopped and the furnace was cooled. After 7 days since then, the graphitized articles were removed from the chambers. The oxidation loss of the packing cokes in each chamber is shown in Table 3.

Table 3

| No. | Process | Oxidation loss (g/cm²) |
|---|---|---|
| 1 | Invention process (Chamber A) | 10.2 |

Table 3-Continued

| No. | Process | Oxidation loss (g/cm²) |
|---|---|---|
| 2 | Comparison example (Chamber B) | 27.5 |

As clear from the results shown in Table 3, it will be understood that the oxidation loss of the packing cokes in the process of this invention (No. 1) was greatly less than that in the conventional process (No. 2).

In addition, in the case of the conventional process, the silica sands were formed a rigid crust and thus spaces were formed between the upper surface of the packing cokes and the crust of the silica sands.

While the invention has been described in detail and with reference to specific embodiments thereof, it will be apparent to one skilled in the art that various changes and modifications canbe made therein without departing from the spirit and scope thereof.

What is claimed is:

1. In the process of baking or graphitizing carbon moldings covered with packing cokes at an elevated temperature, the improvement to reduce oxidation of the packing cokes which comprises covering the upper surfaces of the packing cokes with at least two layers of a refractory having sizes larger than the sizes of the packing cokes and sizes of at least about 5 mm but smaller than about 50 mm. and being durable to the temperature of the baking or graphitizing operation.

2. The process according to claim 1 wherein the refractory is used in the form of balls, granules, tablets or cubes.

3. The process according to claim 1 wherein the refractory has the sizes of from 5 to 30 mm.

4. The process according to claim 1 wherein the process is for baking and the refractory has a refractoriness of higher than 900°C.

5. The process according to claim 1 wherein the process is for graphitizing and the refractory has a refractoriness of higher than about 1600°C.

6. The process according to claim 1 wherein the process is for baking and the refractory is made from alumina, clay, silica, magnesia, zirconia or zircon.

7. The process according to claim 6 wherein the refractory is sintered high quality alumina balls, sintered chamotte balls or sintered zirconia balls.

8. The process according to claim 1 wherein the process is for graphitizing and the refractory is made from sintered high quality alumina, sintered silicon carbide, sintered zirconia or sintered zircon.

9. The process according to claim 8 wherein the refractory is high quality alumina balls, silicon carbide balls or zirconia balls.

* * * * *